(12) United States Patent
Kenmochi et al.

(10) Patent No.: US 8,985,859 B2
(45) Date of Patent: Mar. 24, 2015

(54) CAGE AND ROLLING BEARING

(71) Applicant: NSK Ltd., Shinagawa-ku, Tokyo (JP)

(72) Inventors: Kenta Kenmochi, Fujisawa (JP);
Atsushi Minakami, Fujisawa (JP);
Yoshiaki Katsuno, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/131,820

(22) PCT Filed: Nov. 29, 2012

(86) PCT No.: PCT/JP2012/080993
§ 371 (c)(1),
(2) Date: Jan. 9, 2014

(87) PCT Pub. No.: WO2013/081076
PCT Pub. Date: Jun. 6, 2013

(65) Prior Publication Data
US 2014/0193111 A1    Jul. 10, 2014

(30) Foreign Application Priority Data

Nov. 29, 2011   (JP) ................................. 2011-260293
Nov. 27, 2012   (JP) ................................. 2012-258260

(51) Int. Cl.
*F16C 33/38* (2006.01)
*F16C 33/46* (2006.01)
*F16C 19/06* (2006.01)

(52) U.S. Cl.
CPC ......... *F16C 33/3887* (2013.01); *F16C 33/4676* (2013.01); *F16C 19/06* (2013.01)
USPC ....................................................... 384/533

(58) Field of Classification Search
CPC .................................................. F16C 33/3887
USPC .................................................. 384/523, 533
See application file for complete search history.

(56) References Cited

U.S. PATENT DOCUMENTS 3,918,778 A * 11/1975 Jacobson et al. ............... 384/523
4,653,938 A *  3/1987 Fenwick ....................... 384/533
(Continued)

FOREIGN PATENT DOCUMENTS

JP           48-99540 A     12/1973
JP          58-180839 A     10/1983
(Continued)

OTHER PUBLICATIONS

International Search Report dated Dec. 25, 2012 issued in International Application No. PCT/JP2012/080993 (PCT/ISA/210/220).
(Continued)

*Primary Examiner* — Thomas R. Hannon
(74) *Attorney, Agent, or Firm* — Sughrue Mion, PLLC

(57) ABSTRACT

A cage 11 for holding a plurality of rolling elements 20 incorporated between an inner ring and an outer ring by a plurality of pockets with their centers arranged at regular intervals in the revolving direction of the rolling elements 20 includes at least one drive pocket 14 having a smaller clearance 22 in the revolving direction of the cage 11 and rolling elements 20 than the clearances of the remaining non-drive pockets 15 in the cage 11. Thus, drive power to be applied to the cage 11 can be always maintained constant and the swinging motion of the cage 11 during revolution can be prevented, thereby being able to reduce cage sounds.

8 Claims, 8 Drawing Sheets

(56) References Cited

U.S. PATENT DOCUMENTS

| | | | | |
|---|---|---|---|---|
| 4,715,247 | A | * | 12/1987 | Honda et al. ............ 384/533 |
| 5,248,203 | A | * | 9/1993 | Agari ........................ 384/49 |
| 5,394,284 | A | * | 2/1995 | Benson et al. ........... 384/528 |
| 6,692,156 | B1 | * | 2/2004 | Ohura et al. ............. 384/533 |

FOREIGN PATENT DOCUMENTS

| JP | 1-153816 A | 6/1989 |
|---|---|---|
| JP | H01153817 A | 6/1989 |
| JP | 1-153817 U | 10/1989 |
| JP | 5-86023 U | 11/1993 |
| JP | 2007-170470 A | 7/2007 |

OTHER PUBLICATIONS

Written Opinion dated Dec. 25, 2012 issued in International Application No. PCT/JP2012/080993 (PCT/ISA/237).

* cited by examiner

CAGE AND ROLLING BEARING

TECHNICAL FIELD

The invention relates to a cage for use in a precision bearing required of high precision in high loads and in high-speed rotation, specifically, to a cage which is used in a machine tool spindle, a ball screw support bearing, and machines for railroads, machines for aviation and general industrial machines and provides a small cage sound, and a bearing incorporating such cage therein.

BACKGROUND ART

In a cage, rolling elements are stored with clearances formed between the rolling elements and cage in order that the rolling elements rotating on their axes by the rotation of inner and outer rings can be prevented from touching each other. The cage can move three-dimensionally within a range permitted by clearances formed between the cage and inner or outer ring.

An ideally formed rolling bearing, in which inner and outer rings have the same inclinations and rolling elements have the same diameters, has a characteristic that its rotation is stable and the rolling elements are arranged evenly. Especially, a precision bearing for use in a machine tool spindle or the like is high in part precision and can be incorporated into the machine with high precision. Therefore, in operation, the rolling elements are easy to be arranged evenly. On the other hand, in order to operate a rolling bearing stably when an unbalanced load applied to the rolling bearing varies, the even arrangement of the rolling elements is necessary; and thus, the pockets of the cage are basically arranged evenly.

The cage is rotated by drive power from the rolling elements revolving (along the circumference of the bearing) by the rotation of inner and outer rings. Also, a cage includes: a rolling element guide type cage the revolution of which is guided while the radial-direction movement thereof is restricted by rolling elements through the pockets of the cage; and, a raceway ring guide type cage the revolution of which is guided while the radial-direction movement thereof is restricted by the outside diameter of the inner ring or by the inside diameter of the outer ring through the inside diameter or outside diameter of the cage.

FIGS. 8A and 8B show an example of a rolling bearing 82 using a cage of a conventional inner ring guide type. FIG. 8A is a cross section view of the rolling bearing 82, and FIG. 8B is a longitudinal section view of the rolling bearing 82. As shown in FIGS. 8A and 8B, in an inner ring guide type cage 81, in order that its radial-direction movement can be restricted by an inner ring 84 and its revolution can be guided smoothly, there is formed a minute clearance 85 between the inside diameter of the cage 81 and the outside diameter of the inner ring 84. Although not shown, in an outer ring guide type cage as well, similarly, the radial-direction movement is restricted by the outer ring and a minute clearance is formed between the outside diameter of the cage and the inside diameter of the outer ring.

In a rolling element guide type cage, in order that the radial-direction movement is restricted by rolling elements through the pockets of the cage and the revolution can be guided smoothly, there are formed minute clearances respectively between the pockets and rolling elements stored in the pockets. In this case, the amount of restriction of the radial-direction movement of the cage is determined in consideration of the minute clearances between the pockets and rolling elements, the positions of the respective pockets, the positions of the rolling elements in the pockets and the like.

The rolling element guide type cage has a plurality of guide portions, that is, the plurality of pockets, whereas the raceway ring guide type cage has one guide portion, that is, the inside diameter or outside diameter. Therefore, since the raceway ring guide type cage can restrict the radial-direction movement of the cage with higher precision, the cage is hard to swing greatly within the bearing and thus is used often in a bearing required of high precision in high loads and in high-speed rotation.

Since the cage 81 has clearances between the pockets 83 and rolling elements 86, when the cage 81 revolves ideally and the rolling elements are arranged evenly, the cage 81 is not restricted by the rolling elements 86. However, when the cage 81 loses balance due to external force such as gravity and friction and thus the rolling elements 86 are caused to move relative to the bearing 82, there is a possibility that the cage 81 can rotate while swinging. Thus, in order to prevent the swinging motion of the cage 81, there is provided a technology which arranges the rolling elements 86 unevenly to thereby restrict the cage 81 (for example, see the patent document 1).

In the patent document 1, in order to restrict the cage, the center of one pocket is slightly shifted from a pitch circle connecting the centers of other pockets, and the revolving movements of the rolling elements are out of phase so as to prevent the rolling elements from being arranged evenly in the pockets disposed at regular intervals in the circumferential direction.

There is also proposed a rolling element guide type cage including: a restricting pocket portion having an axial-direction pocket clearance formed narrow; and, a rolling element guide pocket portion with a spherical surface having a slightly larger curvature than a ball used as the rolling element (for example, see the patent document 2). In the patent document 2, the contact of the ball serving as the rolling element with the inner ring and outer ring is prevented by forming an end portion in the spherical surface of the rolling element guide pocket portion, and the axial-direction movement of the cage is restricted by the restricting pocket portion, while the circumferential-direction movement of the cage is restricted by the rolling element guide pocket portion.

RELATED ART REFERENCE

Patent Document

Patent Document 1: JP-UM-A-H05-86023
Patent Document 2: JP-A H01-153817

SUMMARY OF THE INVENTION

Problems to be Solved by the Invention

However, since the pockets 83 of the conventional cage are the same in shape and size but the rolling elements 86 change their movements according to the operating conditions such as the revolving speeds of the inner ring 84 and outer ring 87, the positions of the pockets 83 where the rolling elements 86 give the cage 81 drive power cannot be specified.

When the rolling elements 86 apply careless restriction force to the cage 81, the friction between the cage 81 and rolling elements 86 increases to restrict the rotation of the rolling elements 86, thereby increasing friction torque. The increased friction torque increases the contact pressure between the rolling elements 86 and raceway rings, which has ill effects on the oil membrane condition. As a result, the wear and vibrations of the rolling elements raceway rings increase, causing the shortened life and the like of the bearing 82.

A bearing, when it rotates normally, generates successive sounds called race sounds caused when the rolling elements 86 rolls on their orbits. Unless the race sounds are obviously large, normally, they will not be recognized as strange sounds. However, when the cage swings while revolving, the cage collides with the rolling elements or raceway rings to thereby cause intermittent collision sounds. The collision sounds are called cage sounds and are recognized as unpleasant noised, thereby raising a problem in a precision machine tool and the like required of high precision, low vibration, and low noise.

In the patent document 1, in order to prevent the rolling elements from being arranged evenly at or above a given level, the center of one pocket is shifted in the radial direction with respect to the centers of the other pockets. When the rolling elements are arranged unevenly, the rigidity and rotation accuracy of the bearing degrades, resulting in the increased vibration. Also, this technique cannot be applied to a cage the pockets 83 of which are straight in shape.

Also, in a bearing using grease lubrication, when the rolling elements 86 continue to rotate on their axes with no contact with the pockets 83 of the cage 81, lubricating oil is detached by centrifugal force and thus the lubricating oil of the rolling elements 86 is exhausted to facilitate the surface roughening of the rolling surfaces 86 of the bearing 82, thereby raising a fear that the bearing torque can increase and noise can be generated. Also, there is a problem that the rolling elements 86 are not contacted with the pockets 83 of the cage 81.

In the rolling element guide type cage as in the patent document 2, since it receives drive power only from the balls, it is enough that the cage can balance the drive power supplied from the balls. However, since the rolling element guide pocket portion is formed as a spherical hole having a curvature slightly larger than the ball, distances between the balls and the wall surfaces of the rolling element guide pocket portions are equal in all directions of the spherical hole. Therefore, since the ball can be contacted with the wall surfaces in other directions than the circumferential direction of the rolling element guide type cage to apply excess power in the radial direction or in the axial direction, the movement of the cage is liable to be unstable. Also, since the rolling element guide pocket portion is formed as a spherical surface having a curvature slightly larger than the ball, when the ball is contacted with the circumferential-direction wall surface, the ball is received by a surface. Therefore, the drive power applied to the cage from the ball is dispersed in the radial direction and in the axial direction.

The invention is made in view of the above problems. Thus, it is an object of the invention to provide a cage which, by previously limiting pockets for receiving drive power from rolling elements, can always maintain constant drive power given to the cage to prevent the swinging rotation of the cage and thus can reduce cage sounds.

Means for Solving the Problems

In attaining the above object, the invention has the following characteristics.
(1): A cage for holding a plurality of rolling elements incorporated between an inner ring and an outer ring by a plurality of pockets in which centers of the pockets set at regular intervals in the revolving direction of the rolling elements, wherein the cage includes at least one drive pocket the clearance of which in the revolving direction of the cage and the rolling elements is formed smaller than those of the remaining pockets in the cage, and the remaining pockets are non-drive pockets.
(2): A cage according to the characteristic (1), wherein the cage is a raceway ring guide type cage.
(3): A cage according to the characteristic (1) or (2), wherein the rolling elements are balls.
(4): A cage according to any one of the characteristics (1) to (3), wherein the plurality of pockets are substantially equal in volume.
(5) A cage according to any one of the characteristics (1) to (4), wherein the axial-direction clearances of at least three drive pockets arranged at phase intervals of 180 degrees or less are formed smaller than those of the remaining pockets in the cage, thereby restricting the amount of the axial-direction movement of the cage.
(6) A cage according to any one of the characteristics (1) to (4), wherein the axial-direction clearances of at least three non-drive pockets arranged at phase intervals of 180 degrees or less are formed smaller than those of the remaining pockets in the cage, thereby restricting the amount of the axial-direction movement of the cage.
(7) A cage according to any one of the characteristics (1) to (4), wherein the axial-direction clearances of at least three pockets arranged at phase intervals of 180 degrees or less are formed smaller than those of the remaining pockets in the cage, thereby restricting the amount of the axial-direction movement of the cage, and the at least three pockets are combinations of the drive pocket and the non-drive pocket.
(8) A rolling bearing using a cage according to any one of the characteristic (1) to (7).

Advantage of the Invention

According to the invention, since the pocket for receiving drive power from the rolling elements is limited, the drive power given to the cage can be maintained constant, the swinging rotation of the cage can be prevented and thus the cage sounds can be reduced.

BRIEF DESCRIPTION OF THE DRAWINGS

FIG. 1A is a perspective view, FIG. 1B is a cross section view, FIG. 1C is a cross section view, with the main parts of the cage enlarged, and FIG. 1D is a view equivalent to a circumferential-direction section with its main parts enlarged.

FIG. 8A is a cross section view and FIG. 8B is a longitudinal section view.

MODES FOR CARRYING OUT THE INVENTION

Now, description is given below of embodiments of a cage and a rolling bearing according to the invention with reference to the accompanying drawings. A first embodiment provides an example where the number of pockets for driving the cage is one. A second embodiment provides an example where three pockets for driving the cage are arranged at random. A third embodiment provides an example where three pockets for driving the cage are arranged collectively. A fourth embodiment provides an example where three pockets for driving the cage are arranged at regular intervals. A fifth embodiment provides an example where two pockets for driving the cage are arranged at regular intervals. A sixth embodiment provides an example where two pockets for driving the cage are arranged collectively.

Figure 1A:
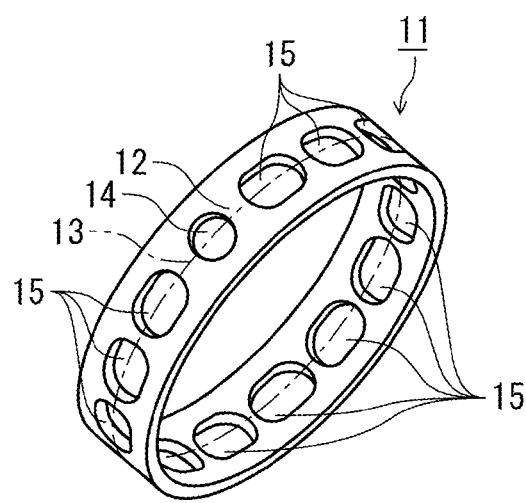
FIGS. 1A to 1D show a cage according to a first embodiment of the invention. Specifically.
Figure 1B:
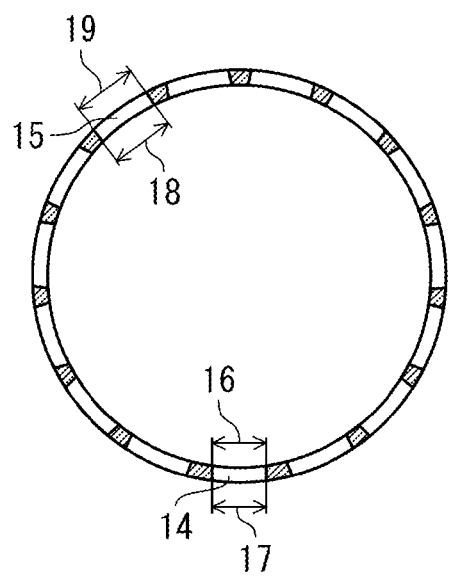
Figure 1C:
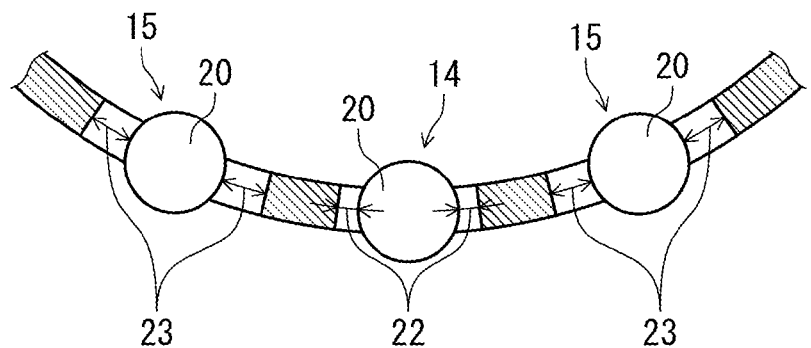
Figure 1D:
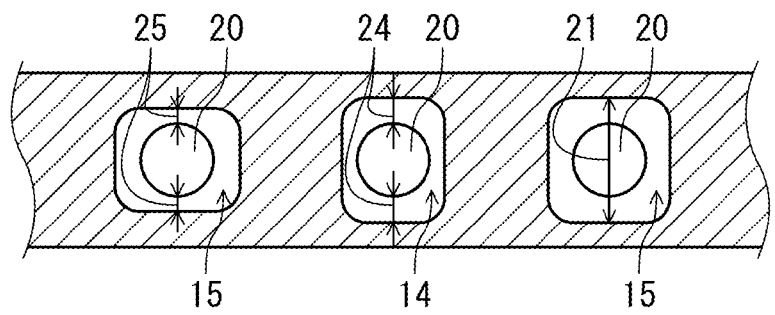

FIGS. 1A to 1D respectively show a cage according to a first embodiment of the invention. FIG. 1A is a perspective view of a cage according to the first embodiment of the invention. FIG. 1B is a cross section view of the cage according to the first embodiment of the invention. FIG. 1C is a cross section view of the cage according to the first embodiment of the invention with its main parts enlarged. And, FIG. 1D is used to explain how to restrict the axial-direction movement of the cage and is a view equivalent to a circumferential-direction section with the main parts of the cage enlarged.

As shown in FIGS. 1A and 1B, the cage 11 of the invention is a raceway ring guide type cage for use in a rolling bearing. The annular-shaped main body 12 of the cage 11 includes a drive pocket 14 and fourteen non-drive pockets 15 in such a manner that the centers of the respective pockets on a pitch circle 13 connecting the centers of the pockets are arranged at regular intervals. The cage 11 may preferably be formed of: plastic materials (including reinforcing materials such as glass fibers, carbon fibers and aramid fibers) generally used as cage materials such as phenolic resin, nylon resin, polyetheretherketone resin (PEEK) and polyphenylenesulfide resin (PPS); and, metal materials such as a copper alloy, stainless steel, iron material (including iron products the surfaces of which have undergone surface treatments such as plating, coating and chemical conversion treatment). However, the materials of the cage 11 are not limited to the above but may also be any other materials so long as they can be worked into a general cage shape.

The inner ring side opening width 16 of the drive pocket 14 is equal to the outer ring side opening width 17 thereof, and the inner ring side opening width 18 of the non-drive pocket 15 is equal to the outer ring side opening width 19 thereof. Thus, the wall surfaces of the drive pocket 14 and non-drive pockets 15 are formed to have a shape straight with respect to a direction perpendicular to the revolving direction of the rolling elements 20. Here, the straight shape means that the wall surfaces of the respective pockets contactable by the rolling elements during operation are parallel to a straight line connecting the center of the rolling element and the center of the bearing to each other.

As shown in 1C, a clearance between the rolling element 20 and pocket in the circumferential direction of the drive pocket 14 is formed smaller than a clearance 23 between the rolling element 20 and pocket in the circumferential direction of the non-drive pocket 15. Therefore, the opening width 16 and opening width 17 of the drive pocket 14 are smaller than the opening width 18 and opening width 19 of the non-drive pocket 15. The rolling element 20 incorporated in the non-drive pocket 15 is allowed to move freely according to the rotation of the inner and outer rings within the non-drive pocket 15 formed wider in the revolving direction.

As described above, the clearance 22 in the circumferential direction of the drive pocket 14 is formed smaller than the clearance 23 in the circumferential direction of the non-drive pocket 15. Therefore, the rolling element 20 stored in the drive pocket 14 is contacted with the wall surface of the drive pocket 14 formed to have a shape straight with respect to a direction perpendicular to the revolving direction, thereby applying drive power to the cage 11.

As shown in 1D, the axial-direction movement of the cage 11 is determined by a value obtained when the axial-direction length of the rolling element 20 is subtracted from the length 21 of the pocket in the axial direction of the annular-shaped main body 12, that is, a clearance 24 between the rolling element 20 and drive pocket 14 in the axial direction thereof and a clearance 25 between the rolling element 20 and non-drive pocket 15 in the axial direction thereof.

In the cage 11, the axial-direction clearance 25 of one non-drive pocket 15 is set smaller than the clearance of the remaining non-pockets and the clearance 24 of the drive pocket 14, thereby restricting the axial-direction movement of the cage. However, the axial-direction clearance 24 of the drive pocket 14 may also be set smaller to thereby restrict the movement, or the movement may be restricted by combining these methods.

Here, in order to control the inclination of the rotation axis of the cage 11 with respect to the revolution axis of the rolling element, preferably, three or more pockets for restricting the axial-direction movement amount of the cage 11 may be formed in such a manner that their respective phase distances are less than 180 degrees.

FIGS. 2A to 2L respectively show examples of the shapes of the circumferential-direction pockets of the cage according to the invention. As shown in FIGS. 2A to 2L, the shape of the pockets includes a circle, an ellipse, a square with round corners and the like. However, there can be used any other shape so long as it allows the rolling element to rotate and revolve according to the rotation of the inner and outer rings. In FIG. 2A to 2L, at least one drive pocket 14 is formed. A clearance 22 between the rolling element 20 and pocket in the rotation direction (circumferential direction) of the drive pocket 14 is formed smaller than a clearance 23 between the rolling element 20 and the other pockets 15 in the rotation direction of thereof.

Figure 2A:
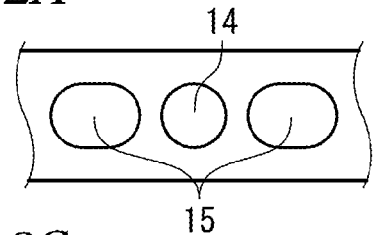
FIGS. 2A to 2L respectively show examples of the shapes of the circumferential-direction pockets of the cage according to the invention.
Figure 2B:
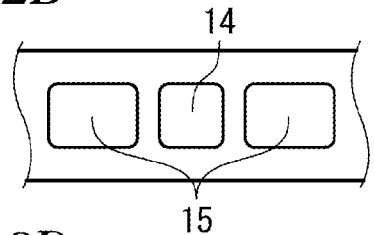
Figure 2C:
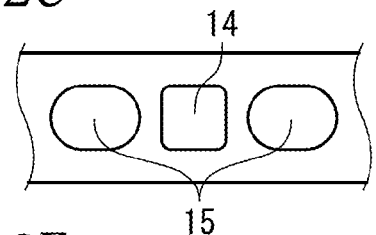
Figure 2D:
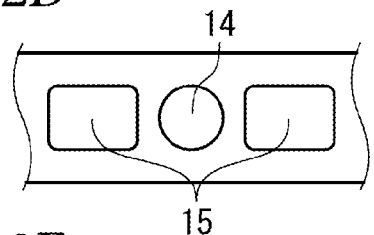
Figure 2E:
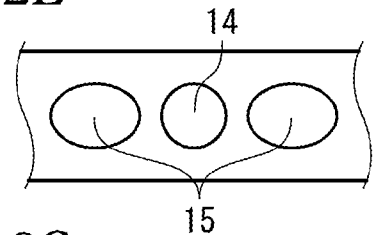
Figure 2F:
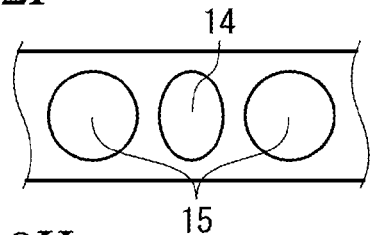
Figure 2G:
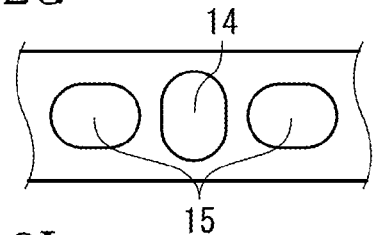
Figure 2H:
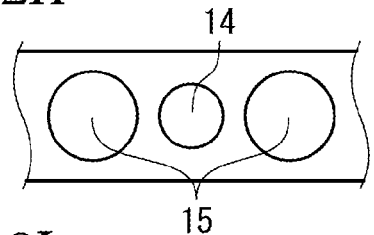
Figure 2I:
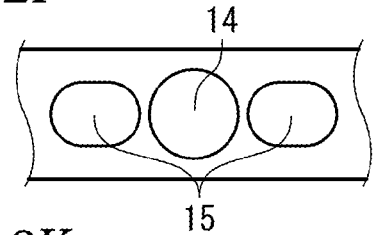
Figure 2J:
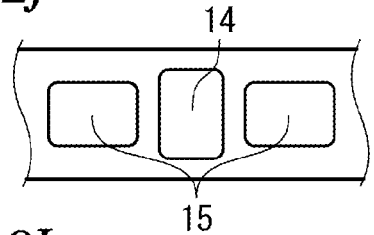
Figure 2K:
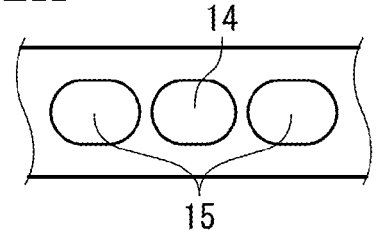
Figure 2L:
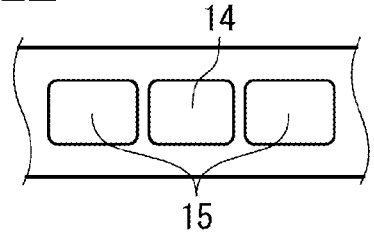

FIG. 2A shows an example in which, similarly to FIG. 1, a circular pocket and two elliptic pockets are combined. FIG. 2B shows an example in which a square pocket with round corners and two rectangular pockets with round corners are combined. FIG. 2C shows an example in which a square pocket with round corners and two elliptic pockets are combined. FIG. 2D shows an example in which a circular pocket and two rectangular pockets with round corners are combined. FIG. 2E shows an example in which a circular pocket and two elliptic pockets are combined. FIG. 2F shows an example in which an elliptic pocket and two circular pockets are combined. FIG. 2G shows an example in which three pockets respectively having an elliptic section but arranged in different directions are combined. FIG. 2H shows an example in which a small circular pocket and two large circular pockets are combined. FIG. 2I shows an example in which a circular pocket and two elliptic pockets are combined. FIG. 2J shows an example in which three pockets respectively having a section of a rectangular shape with round corners but arranged in different directions are combined. FIG. 2K shows an example in which three elliptic pockets having different rotation-direction clearances are combined. FIG. 2L shows an example in which three rectangular pockets having different rotation-direction clearances are combined. Into the rectangular pockets each with round corners and the square pocket with round corners, there can be incorporated a cylindrical rolling element or a needle-shaped rolling element. When the rolling element 20 is a ball, a circular pocket and a square pocket with round corners, or, an elliptic pocket and a square pocket with round corners may be used in combination.

In the examples shown in FIGS. 2A, 2D, 2E and 2H, the circular pocket having a short length in the circumferential direction serves as the drive pocket 14 and applies drive power to the cage 11. In the examples shown in FIGS. 2B and 2C, the square pocket with round corners serves as the drive pocket 14 and applies drive power to the cage 11. In the example shown in FIG. 2F, the elliptic pocket arranged to be shorter in length in the circumferential direction serves as the drive pocket 14 and applies drive power to the cage 11. In the example shown in FIG. 2G, the elliptic pocket arranged to be longer in length in the axial direction and shorter in the circumstantial direction serves as the drive pocket 14 and applies drive power to the cage 11. In the example shown in FIG. 2I, a circular pocket arranged to be longer in length in the axial direction serves as the drive pocket 14 and applies drive power to the cage 11. In the example shown in FIG. 2J, the rectangular pocket with round corners arranged to be longer in length in the axial direction and shorter in the circumferential direction serves as the drive pocket 14 and applies drive power to the cage 11. In the example shown in FIG. 2K, the elliptic pocket having a small rotation-direction clearance serves as the drive pocket 14 and applies drive power to the cage 11. In the example shown in FIG. 2L, the rectangular pocket having a small rotation-direction clearance serves as the drive pocket 14 and applies drive power to the cage 11.

In FIG. 2A, the wall surfaces of the pockets are all curved surfaces and, in FIG. 2B, the wall surfaces of the pockets are all planes. Also, in FIG. 2C, the wall surfaces of the drive pocket 14 are planes and the wall surfaces of the non-drive pockets 15 are curved surfaces and, in FIG. 2D, the wall surface of the drive pocket 14 is a curved surface and the wall surfaces of the non-drive pockets 15 are planes. In this manner, the wall surfaces of the drive pocket and non-drive pockets may be curved surfaces or planes, or both of them may be intermingled, so long as the relationship between the clearances in the circumferential direction is satisfied. Even when the wall surfaces of the pockets are planes, only the contact portion of the pocket with the rolling element may have a plane, whereas the corners of the pocket not to be contacted with the rolling elements may be curved surfaces or planes, that is, they are not limited to any specific shape.

A pocket having curved wall surfaces, as in FIG. 2A, may have a circular shape or an elliptic pocket the curved portion of which has a given radius, or, as in FIGS. 2E and 2F, may be an elliptic shape the radius of which is not uniform. Here, when the wall surface of a pocket is a curved surface, in order for the rolling element to be contacted with the pocket only at a point, the radius of curvature of such curved surface may preferably be larger than the radius of curvature of the rolling element (ball).

In FIG. 2G, the non-drive pockets 15 restrict the axial-direction movement of the cage 11. Especially, in a rolling bearing using grease lubrication, the cage 11 also plays a role to hold lubricating oil for the rolling element 20. However, when the rolling element 20 rotates on its axis without touching the pocket the lubricating oil is removed from the cage due to the centrifugal force of the rolling element, and the lubricating oil of the rolling element 20 is exhausted to promote the surface roughening of the rolling surface 86 of the bearing 82, thereby raising a fear that the bearing torque can increase and noises can be generated. Therefore, since the rolling element 20 may preferably be contacted with the pocket at any portion thereof, the amount of the axial-direction movement of the cage 11 may preferably be restricted by the non-drive pockets 15. However, this is not limitative but, as shown in FIG. 2H, the amount of the axial-direction movement of the cage 11 may also be restricted by the drive pocket 14 or may also be restricted by a combination of the drive pocket 14 and non-drive pockets 15.

Also, in the embodiment, the respective pockets may have any shape so long as the relationship between the clearances in the circumferential direction is satisfied. However, as in the embodiment, when the drive pocket 14 and non-drive pocket 15 are different in shape from each other, they can be unbalanced depending on their arrangement. Therefore, as in FIGS. 2C and 2D, when one of the drive pocket 14 and non-drive pocket 15 is formed to have a curved surface and the other is formed to have a plane, or, as in FIGS. 2G, 2I and 2J, when the axial-direction pocket clearance of the drive pocket 14 is set large, the volume values of the respective pockets can be adjusted substantially equal to each other, thereby being able to solve the imbalance of the pockets. Also, in the examples shown in FIGS. 2K and 2L, although the drive pocket 14 and non-drive pockets 15 are equal in the axial-direction clearances thereof, by making also the axial-direction clearances differ from each other, the volume values of the pockets may also be adjusted. Also, although not shown, especially, in a rectangular pocket, when an escape shape or a similar shape is formed in the portion thereof (for example, the corner portion of the pocket) that does not touch the rolling element, the imbalance of the pockets can be solved. Further, the imbalance of the pockets may also be solved by increasing or decreasing the weight of the portion situated in opposite phase to the portion where the imbalance is generated. A portion the weight of which is to be increased or decreased is not limited to the pocket. For example, when a projecting portion, a recessed portion or a hole is formed in a pillar portion adjoining the pocket in the peripheral direction or in annular portions situated on both sides of the pocket in the axial direction, the weight can be increased or decreased.

Table 1 shows the results of a test conducted on the cage according to the first embodiment of the invention shown in FIG. 1 and a conventional cage to check whether the cage sound is generated or not. In this test, there were used cages 11 incorporated in bearings of a grease lubrication type which respectively have an outside diameter of 110 mm, an inside diameter of 70 mm and a width of 20 mm and are back-to-back combined in two rows. After the bearings were driven and rotated sufficiently under the fixed position preload while using a belt, the conditions of cage sounds generated at the 3000 $min^{-1}$ time and at the 5000 $min^{-1}$ time were observed.

TABLE 1

| Test Cages | Generation of cage sound (3000 $min^{-1}$) | Generation of cage sound (5000 $min^{-1}$) |
|---|---|---|
| Cage of the invention | No | No |
| Prior-art Cage | Yes | Yes |

In the conventional cage in which pockets are formed equal in width in the circumferential direction, generation of the cage sound was confirmed. However, in the cage 11 according to the first embodiment of the invention, no cage sound was confirmed and the operation of the cage with low noise was possible.

Table 2 also shows the results of a test conducted on the cage according to the first embodiment of the invention shown in FIG. 1 and a conventional cage to check whether the cage sound is generated or not. In this test, there were used cages 11 incorporated in bearings of an oil/air lubrication type which respectively have an outside diameter of 55 mm, an inside diameter of 30 mm and a width of 13 mm are back-to-back combined in four rows. After the cages were driven and rotated sufficiently under the fixed position preload while using a belt, the conditions of cage sounds generated at the 3000 min$^{-1}$ time and at the 5000 min$^{-1}$ time were observed.

TABLE 2

| Test Cages | Generation of cage sound (5000 min$^{-1}$) | Generation of cage sound (10000 min$^{-1}$) |
|---|---|---|
| Cage of the invention | No | No |
| Prior-art Cage | Yes | Yes |

In the conventional cage in which pockets are formed equal in width in the circumferential direction, generation of the cage sound was confirmed. However, in the cage 11 according to the first embodiment of the invention, no cage sound was confirmed and the operation of the cage with low noise was possible.

As described above specifically, in the first embodiment, there is used one drive pocket 14 having a clearance smaller than the clearances of the fourteen non-drive pockets 15 in the along-cage-peripheral-direction rotation of the rolling element 20. In this case, since the number of the rolling elements 20 for transmitting drive power to the cage 11 is limited to one, the rotation balance of the cage 11 can be stabilized and thus the cage 11 can be guided smoothly with no swinging motion by the raceway ring, namely, the inner or outer ring, thereby being able to eliminate the cage sound.

Also, since the wall surfaces of the drive pocket 14 and non-drive pockets 15 respectively have a shape straight in a direction perpendicular to the revolving direction of the rolling element 20, the rolling elements 20 are contacted with the wall surfaces of the drive pocket 14 and non-drive pockets 15 at points in the revolving direction of the rolling element 20. Thus, the cage 11 can be positively driven by the drive pocket 14 the pocket clearance 22 of which is small in the revolving direction of the rolling element 20. As in the cage 11, the rotation of the cage 11 in which the number of drive pockets 14 is limited to one is most stable.

Also, since the number of rolling elements 20 for transmitting drive power to the cage is limited to one, there is not generated tensile stress nor compression stress between the drive pocket 14 and non-drive pockets 15, whereby the drive power to be transmitted to the cage 31 can be made substantially constant and the fatigue breakage of the cage materials is hard to occur.

Also, since only one drive pocket 14 for driving the cage 11 can be formed surely, even in a bearing using grease lubrication, lubricating oil can be smoothly charged to the rolling elements 20 by the drive pocket 14.

Here, in the axial-direction two ends of the wall surfaces of the drive pocket 14 and non-drive pockets 15 respectively having a shape straight in a direction perpendicular to the revolving direction of the rolling elements 20, that is, in the vicinity of the points of intersection between the wall surfaces of the drive pocket 14 and non-drive pockets 15 and the inside diameter surfaces of the cage 11, or, on one side or on both sides of the vicinity of the points of intersection between the wall surfaces of the drive pocket 14 and non-drive pockets 15 and the inside diameter surfaces of the cage 11, there may also be provided thin pawls for swinging prevention as projecting extension portions respectively formed to have such a dimension as can prevent the pawls from touching the rolling elements during revolution. This can prevent the removal of the rolling elements 20 when assembling the cage 11 or when a bearing is incorporated into a shaft or a housing.

Figure 3:
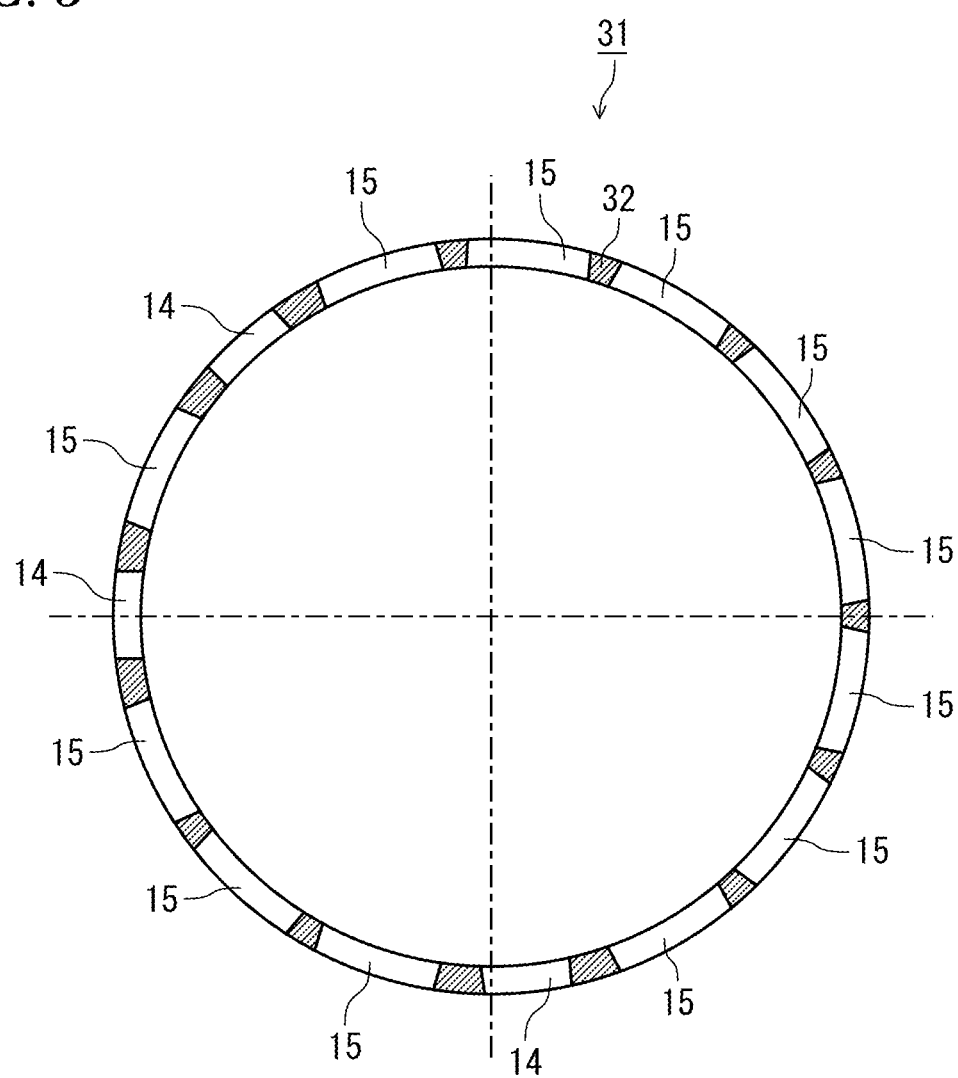
FIG. 3 is a cross section view of a cage according to a second embodiment of the invention.

FIG. 3 is a cross section view of a cage according to a second embodiment of the invention, in which the same parts as the first embodiment are given the same numerals and thus the description thereof is omitted. As shown in FIG. 3, in a cage 31 according to the second embodiment of the invention, in the annular-shaped main body 32 thereof, there are arranged twelve pockets 15 in such a manner that the centers of the pockets 15 are arranged at regular intervals on a pitch circle connecting the centers of the twelve pockets 15. Three drive pockets 14 are arranged at the random positions of the annular-shaped main body 32 and twelve non-drive pockets 15 are arranged at the remaining positions.

In the second embodiment, since the plurality of drive pockets 14 are formed in the cage 31, the rolling elements 20 for transmitting drive power to the cage 31 can be arranged at previously determined multiple positions, whereby drive power to be applied to the cage 31 is allowed to balance well. Also, the formation of the plurality of drive pockets 14 can increase the drive power that is applied to the cage 31. Due to this, when the mass of the cage 31 is large and thus its inertia is large, extension of the acceleration and deceleration speed time due to short of torque and slippage to be generated between the raceway ring of the inner or outer ring and the rolling element 20 can be prevented.

Figure 4:
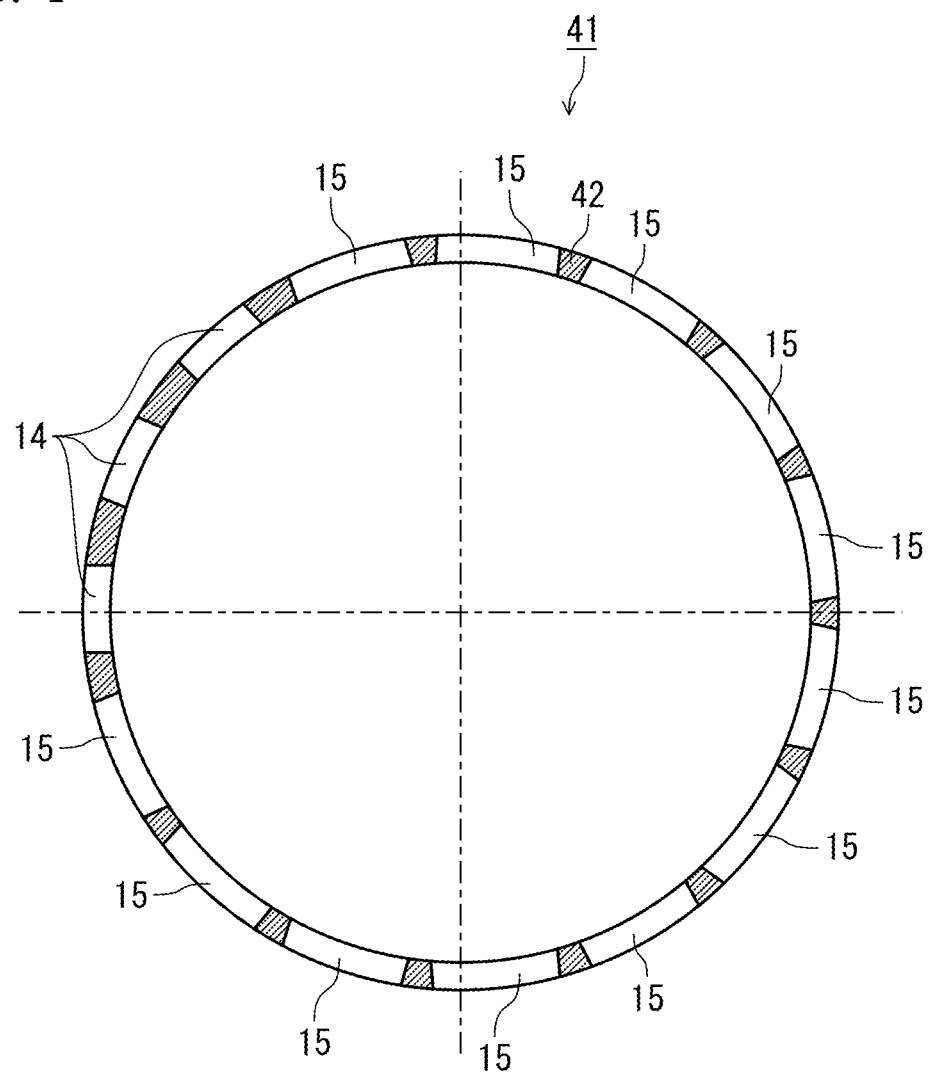
FIG. 4 is a cross section view of a cage according to a third embodiment of the invention.

FIG. 4 is a cross section view of a cage according to a third embodiment of the invention, in which the same parts as in the first embodiment are given the same designations and thus the description thereof is omitted here. As shown in FIG. 4, in the case 41 according to the second embodiment of the invention, three drive pockets 14 and twelve non-drive pockets 15 are arranged successively in an annular-shaped main body 42 in such a manner that the centers of the fifteen pockets are arranged at regular intervals on a pitch circle connecting the centers of the fifteen pockets.

In the third embodiment, since the three drive pockets 14 are formed successively in the cage 41, positions where the plurality of rolling elements 20 transmit the drive power to the cage 41 can be concentrated at one position. Thus, when the rolling elements are arranged unevenly because the bearing receives a radial load or a moment load or because the mounting precision of the bearing is poor, or even when the weight of the cage 41 is large, there can be increased the possibility that all of the drive pockets 14 can be provided with equivalent drive power. This can stabilize the operation of the cage 41.

Figure 5:
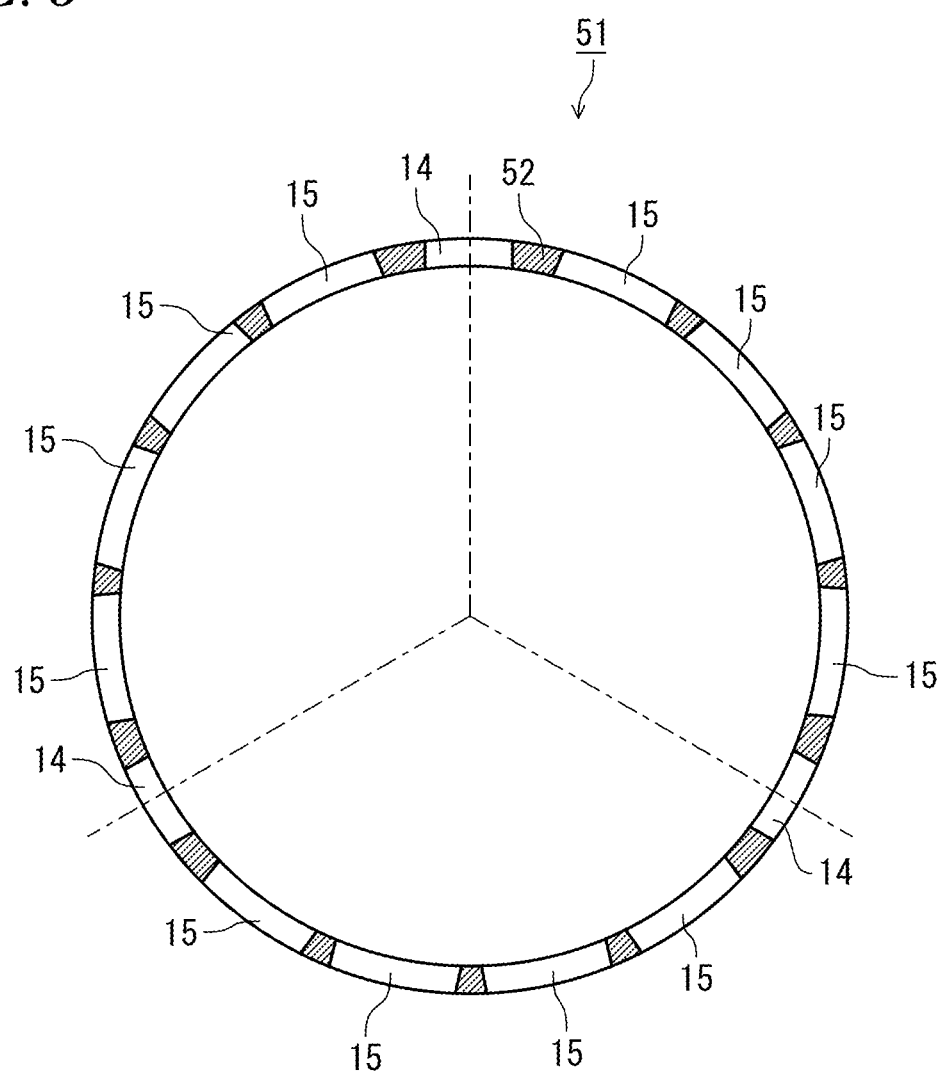
FIG. 5 is a cross section view of a cage according to a fourth embodiment of the invention.

FIG. 5 is a cross section view of a cage according to a fourth embodiment of the invention, in which the same parts as in the first embodiment are given the same designations and thus the description thereof is omitted here. As shown in FIG. 5, in the cage 51 according to the fourth embodiment of the invention, three drive pockets 14 are arranged at regular intervals in an annular-shaped main body 52 and twelve non-drive pockets 15 are interposed between the drive pockets in such manner that the centers of the fifteen pockets are spaced equally from each other on a pitch circle connecting the centers of the fifteen pockets. Thus, the four non-drive pockets 15 are interposed between the drive pockets 14.

In the fourth embodiment, since the three drive pockets 14 are arranged at regular intervals in the cage 51 and thus the drive power to be transmitted to the cage 51 by the rolling elements 20 is allowed to balance well, especially even when the cage revolves at high speeds, the cage is allowed to balance well due to the centrifugal force and thus can revolve stably at high speeds.

Figure 6:
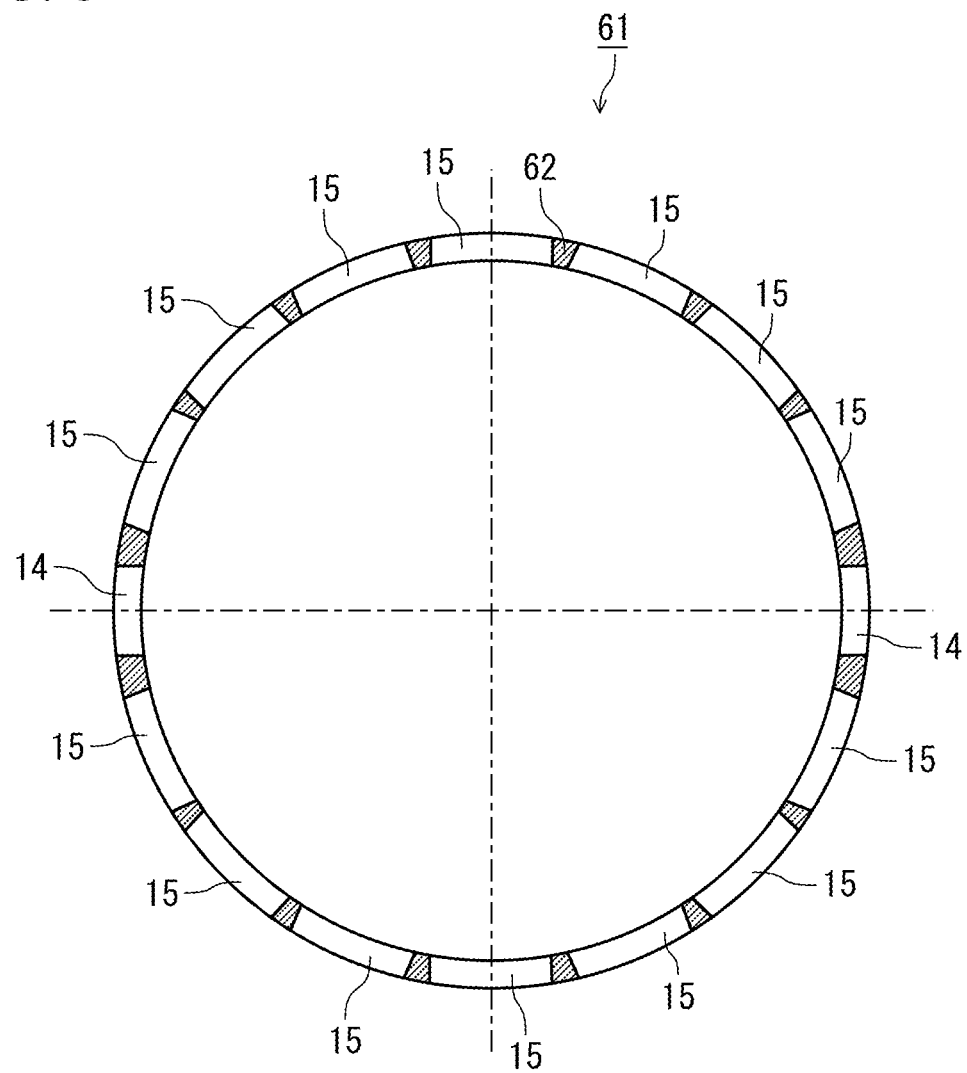
FIG. 6 is a cross section view of a cage according to a fifth embodiment of the invention.

FIG. 6 is a cross section view of a cage according to a fifth embodiment of the invention, in which the same parts as in the first embodiment are given the same designations and thus the description thereof is omitted here. As shown in FIG. 6, in the cage 61 according to the fifth embodiment of the invention, two drive pockets 14 are arranged at regular intervals in an annular-shaped main body 62 and fourteen non-drive pockets 15 are interposed between the drive pockets in such manner that the centers of the sixteen pockets are arranged at regular intervals on a pitch circle connecting the centers of the sixteen pockets. Thus, the seven non-drive pockets 15 are interposed between the drive pockets 14.

In the fifth embodiment, since the two drive pockets 14 are arranged at regular intervals in the cage 61 and thus the drive power to be transmitted to the cage 51 by the rolling elements 20 is allowed to balance well, especially even when the cage revolves at high speeds, the cage is allowed to balance well due to the centrifugal force and thus can revolves stably at high speeds.

Figure 7:
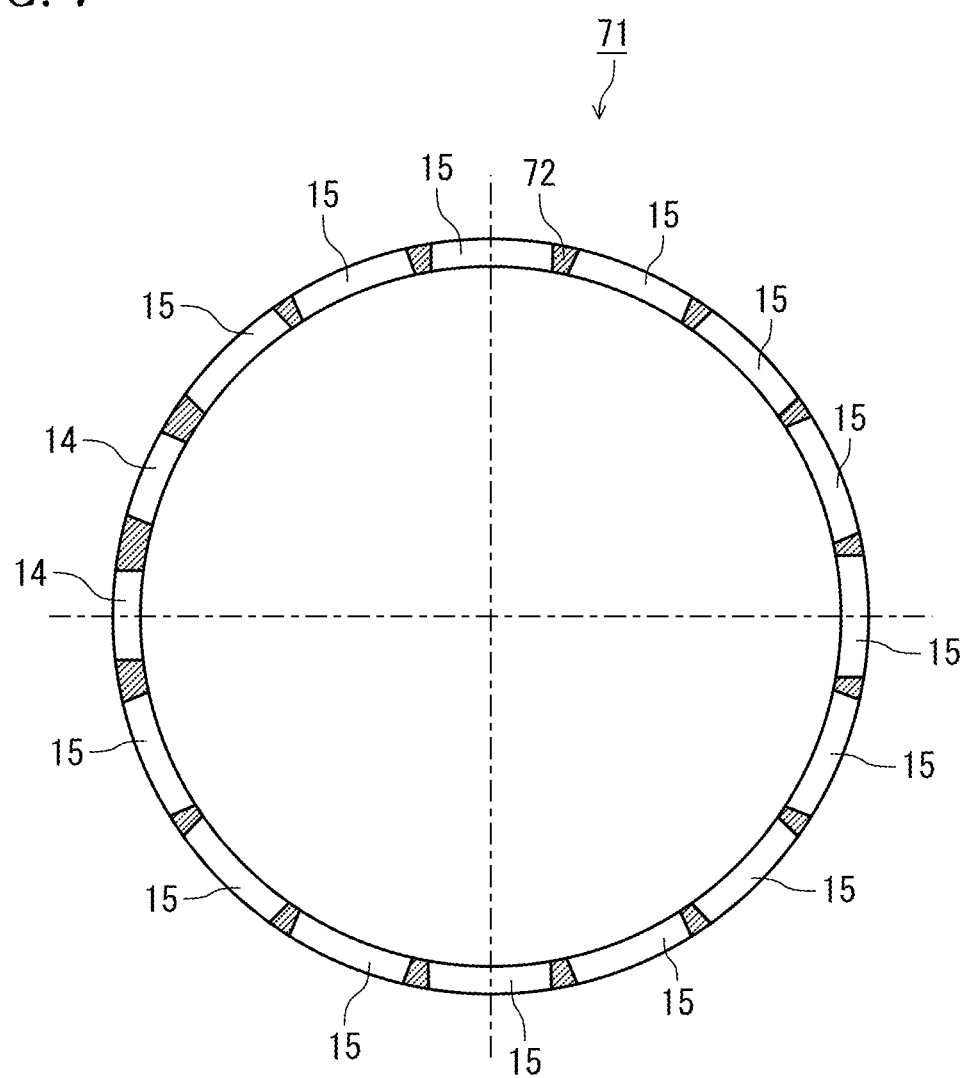
FIG. 7 is a cross section view of a cage according to a sixth embodiment of the invention.
Figure 8A:
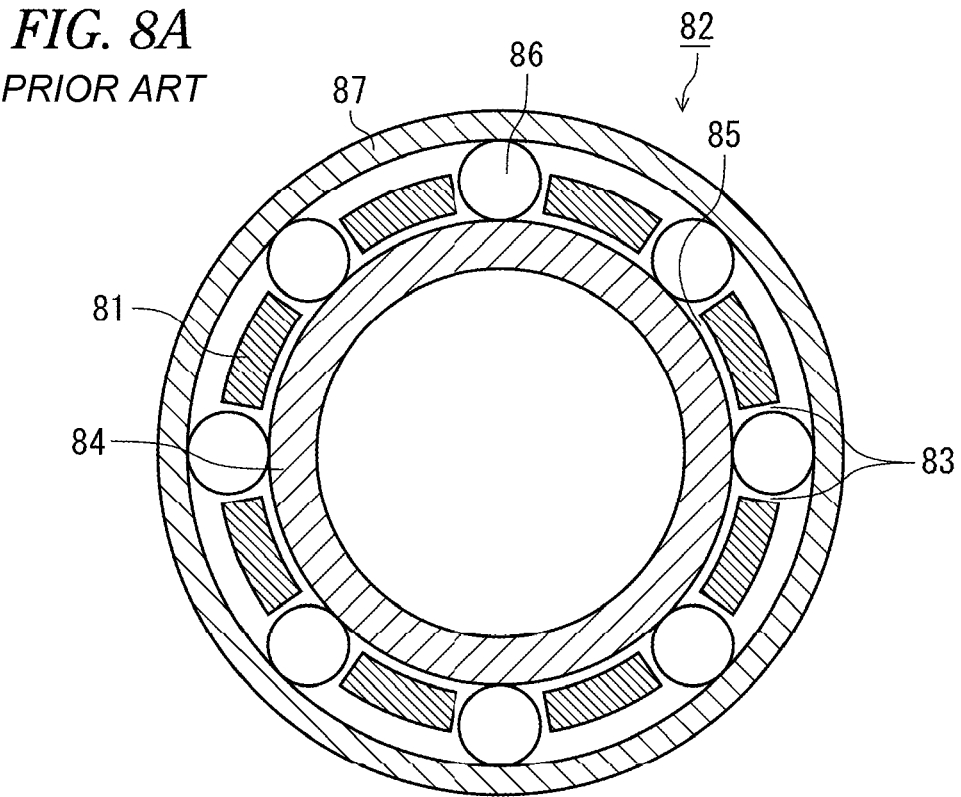
FIGS. 8A and 8B show an example of a rolling bearing using a conventional raceway ring guide type cage. Specifically.
Figure 8B:
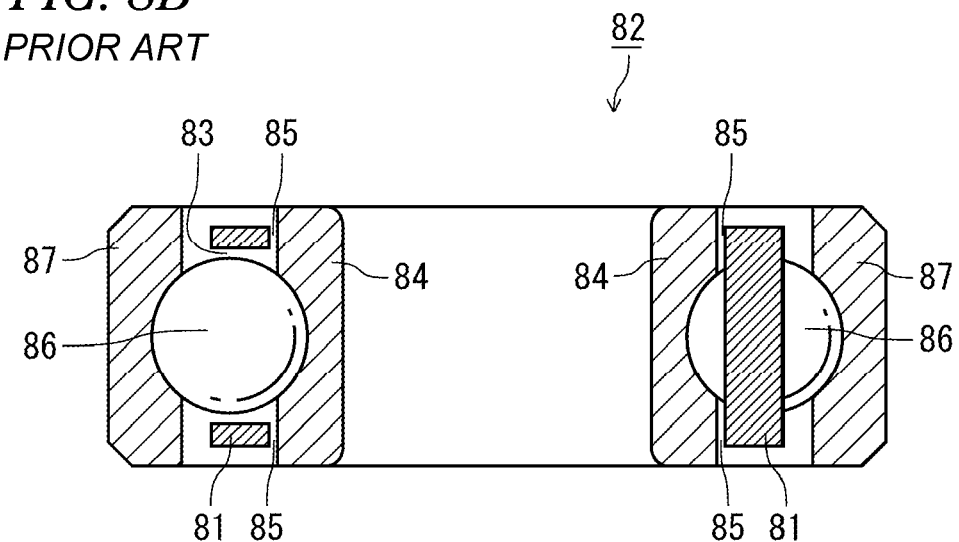

FIG. 7 is a cross section view of a cage according to a sixth embodiment of the invention, in which the same parts as in the first embodiment are given the same designations and thus the description thereof is omitted here. As shown in FIG. 7, in the case 71 according to the sixth embodiment of the invention, two drive pockets 14 and fourteen non-drive pockets 15 are formed successively in an annular-shaped main body 72 in such a manner that the centers of the sixteen pockets are arranged at regular intervals on a pitch circle connecting the centers of the sixteen pockets.

In the sixth embodiment, since the two drive pockets 14 are formed successively in the cage 71, positions where the plurality of rolling elements 20 transmit the drive power to the cage 71 can be concentrated at one position. Thus, when the rolling elements are arranged unevenly because the bearing receives a radial load or a moment load or because the mounting precision of the bearing is poor, or even when the weight of the cage 41 is large, there can be increased the possibility that all of the drive pockets 14 can be provided with equivalent drive power. This can stabilize the operation of the cage 41.

Here, in the second to fourth embodiments, description is given that the number of drive pockets 14 is three, whereas, in the fifth and sixth embodiments, description is given that the number of drive pockets 14 is two. However, the number of drive pockets 14 is not limited to them. In the invention, the smaller the number of drive pockets is, the higher the effect of the cage is. However, in the case that the number of rolling elements for applying drive power is small when the weight of the cage is large due to the size or material thereof, there is a fear that slippage can occur between the rolling elements 20 and raceway rings. Therefore, in some cases, it is preferred that a plurality of drive pockets 14 are formed. The number of drive pockets 14 may be four or more.

Although description has been given heretofore of the enforcing mode and embodiments of the invention, the invention is not limited to the above embodiments but can be enforced while it is changed variously without departing from the scope of the patent claims. The present application is based on the Japanese Patent Application (Japanese Patent Application No. 2011-260293) filed on Nov. 29, 2011 and the Japanese Patent Application (Japanese Patent Application No. 2012-258260) filed on Nov. 27, 2012 and thus the contents thereof are incorporated herein for reference.

DESCRIPTION OF REFERENCE NUMERALS AND SIGNS 11, 31, 41, 51, 61, 71, 81: cage
12, 32, 42, 52, 62, 72, 82: main body
13: pitch circle
14: drive pocket
15: non-drive pocket
16: inner ring side opening width of drive pocket
17: outer ring side opening width of drive pocket
18: inner ring side opening width of non-drive pocket
19: outer ring side opening width of non-drive pocket
20: rolling element
21: pocket length in axial direction of annular-shaped main body 12
22: pocket clearance in circumferential direction of drive pocket
23: pocket clearance in circumferential direction of non-drive pocket
24: clearance in axial direction of drive pocket 14
25: clearance in axial direction of non-drive pocket 14

The invention claimed is:

1. A cage for holding a plurality of rolling elements incorporated between an inner ring and an outer ring by a plurality of pockets in which centers of the pockets set at regular intervals in the revolving direction of the rolling elements, wherein:
the cage includes at least one drive pocket, a clearance of which in the revolving direction of the cage and the rolling elements is formed smaller than those of the remaining pockets in the cage; and
the remaining pockets are non-drive pockets,
wherein an axial-direction clearance of at least one of the non-drive pockets is formed smaller than those of the remaining pockets in the cage, thereby restricting the amount of the axial-direction movement of the cage.

2. The cage according to claim 1, wherein the cage is a raceway ring guide type cage.

3. The cage according to claim 1, wherein the rolling elements are balls.

4. The cage according to claim 1, wherein axial-direction clearances of at least three drive pockets are arranged at phase intervals of 180 degrees or less.

5. A rolling bearing using a cage according to claim 1.

6. A cage for holding a plurality of rolling elements incorporated between an inner ring and an outer ring by a plurality of pockets in which centers of the pockets set at regular intervals in the revolving direction of the rolling elements, wherein:
the cage includes at least one drive pocket, the clearance of which in the revolving direction of the cage and the rolling elements is formed smaller than those of the remaining pockets in the cage; and
the remaining pockets are non-drive pockets,
wherein
axial-direction clearances of at least three non-drive pockets arranged at phase intervals of 180 degrees or less are formed smaller than those of the remaining pockets in the cage, thereby restricting the amount of the axial-direction movement of the cage.

7. A cage for holding a plurality of rolling elements incorporated between an inner ring and an outer ring by a plurality of pockets in which centers of the pockets set at regular intervals in the revolving direction of the rolling elements, wherein:
  the cage includes at least one drive pocket, the clearance of which in the revolving direction of the cage and the rolling elements is formed smaller than those of the remaining pockets in the cage; and
  the remaining pockets are non-drive pockets,
  wherein:
  axial-direction clearances of at least three pockets arranged at phase intervals of 180 degrees or less are formed smaller than those of the remaining pockets in the cage, thereby restricting the amount of the axial-direction movement of the cage; and
  the at least three pockets are combinations of the drive pocket and the non-drive pocket.

8. A cage for holding a plurality of rolling elements incorporated between an inner ring and an outer ring by a plurality of pockets in which centers of the pockets set at regular intervals in the revolving direction of the rolling elements, wherein:
  the cage includes at least one drive pocket, the clearance of which in the revolving direction of the cage and the rolling elements is formed smaller than those of the remaining pockets in the cage; and
  the remaining pockets are non-drive pockets,
  wherein
  the plurality of pockets are substantially equal in volume.

* * * * *